(12) United States Patent
Mitrik et al.

(10) Patent No.: US 11,051,651 B1
(45) Date of Patent: Jul. 6, 2021

(54) INDOOR SMOKELESS GRILL

(71) Applicant: TRISTAR PRODUCTS, INC., Fairfield, NJ (US)

(72) Inventors: James Mitrik, Fairfield, NJ (US); Paul McGrath, Fairfield, NJ (US); Alejandro G. Lozano, Fairfield, NJ (US)

(73) Assignee: TRISTAR PRODUCTS, INC., Fairfield, NJ (US)

( * ) Notice: Subject to any disclaimer, the term of this patent is extended or adjusted under 35 U.S.C. 154(b) by 0 days.

(21) Appl. No.: 17/084,000

(22) Filed: Oct. 29, 2020

(51) Int. Cl.
*A47J 37/06* (2006.01)
*A47J 36/38* (2006.01)
*F24C 15/20* (2006.01)

(52) U.S. Cl.
CPC .......... *A47J 36/38* (2013.01); *A47J 37/0611* (2013.01); *F24C 15/2035* (2013.01); *A47J 2037/0617* (2013.01)

(58) Field of Classification Search
CPC ................ A47J 37/0611; A47J 2037/0617
USPC ................................... 99/377, 379
See application file for complete search history.

(56) References Cited

U.S. PATENT DOCUMENTS

| | | | | |
|---|---|---|---|---|
| 1,977,084 A * | 10/1934 | Person | .............. | A47J 37/0611 99/383 |
| 2,300,061 A * | 10/1942 | Purpura | .............. | A47J 37/0611 99/329 R |
| 3,712,819 A * | 1/1973 | Field | .............. | F24C 15/2042 99/400 |
| 4,241,650 A * | 12/1980 | John | .............. | A47J 37/06 219/525 |
| 6,202,544 B1 * | 3/2001 | Martinez | .............. | A47J 37/0611 219/521 |
| 6,439,108 B1 * | 8/2002 | Wu | .............. | A47J 37/0611 99/349 |
| 8,336,451 B2 * | 12/2012 | Kuo | .............. | A47J 37/0629 99/376 |
| 2015/0033954 A1 * | 2/2015 | Fung | .............. | A47J 37/0694 99/377 |
| 2015/0033957 A1 * | 2/2015 | Fung | .............. | A21B 5/023 99/390 |
| 2016/0100462 A1 * | 4/2016 | Morassut | .............. | A47J 37/049 426/231 |

FOREIGN PATENT DOCUMENTS

| | | | | |
|---|---|---|---|---|
| CA | 2542545 A1 * | 10/2006 | .......... | H05B 6/6482 |
| EP | 2062514 A1 * | 5/2009 | .......... | A47J 37/0611 |

* cited by examiner

*Primary Examiner* — Reginald Alexander
(74) *Attorney, Agent, or Firm* — Johnson, Marcou, Isaacs & Nix, LLC; George Marcou; Scott A. Hendrix

(57) ABSTRACT

The present technology provides a device, such as an electric grill, that cooks food items on two or more sides. The electric grill includes upper and lower elements to create the sealed interior cooking environment. One of the elements of the electric grill includes a pressure plate that compresses the distance between the upper and lower thermal plate to create a sealed interior cooking environment and to engage the food item with both an upper and lower element. The pressure plate may be compressed by one or more spring-actuated cylinders or any other suitable mechanism. The compressed cooking area allows the cooking environment to contain any smoke generated from the cooking environment.

15 Claims, 9 Drawing Sheets

100

INDOOR SMOKELESS GRILL

FIELD OF INVENTION

The present invention relates to cooking devices. In greater particularity, the present invention relates to a cooking device that provides smokeless grilling with one or more thermal plates that provide adjustable pressure to food products in the cooking device.

BACKGROUND

Conventional electric grills typically are made of a lower heated element on which food items are placed. In certain conventional grills, a lid is closed over the food items to retain heat over the food item. The conventional electric grill typically has a pattern, such as grill stripes, cast into the cooking surface of the two elements to imprint the pattern onto the surface of the food item. The electric grill is typically heated by an internal heating element controlled by a temperature controller.

SUMMARY OF THE INVENTION

The present technology provides a device, such as an electric grill with thermal plates, that cooks food items on two or more sides. The electric grill includes upper and lower heating elements to allow for a sealed interior cooking environment. One of the upper or lower elements of the electric grill includes a pressure plate that compresses the distance between the upper and lower elements to create a sealed interior cooking environment and to engage the food item with both an upper and lower element. The pressure plate may be compressed by one or more spring-actuated cylinders or any other suitable mechanism. The sealed cooking area allows the cooking environment to contain any smoke generated from the cooking environment and force contact with the upper and lower elements.

The smoke from the cooking food item is drawn via negative pressure into a smoke recirculation chamber via one or more air outlet slits or openings in a sidewall of the cooking environment. The smoke may be mitigated by one or more processes, such as by passing through the fan blades, passing through a filter, or passing over a bed of water. The air, after having some or all of the smoke removed, is either returned to the cooking environment via one or more air return slits or openings in a sidewall of the cooking environment different from the air outlet openings or expelled from the cooking environment. The lower element includes channels and/or orifices that allow grease or other liquids to drain away from the food item. The grease may be channeled to a collection basin for removal.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

The drawings are appended hereto and form a portion of this disclosure.

DETAILED DESCRIPTION

The examples described herein provide an indoor grill for cooking food items that reduces smoke output to the surrounding environment. The examples describe the indoor grill and features that cause the cooking elements to be spring or pressure actuated to compress the cooking environment, cause the smoke to be retained and reduced, and cause the grease from the food items to be directed away from the cooking environment.

Figure 1:
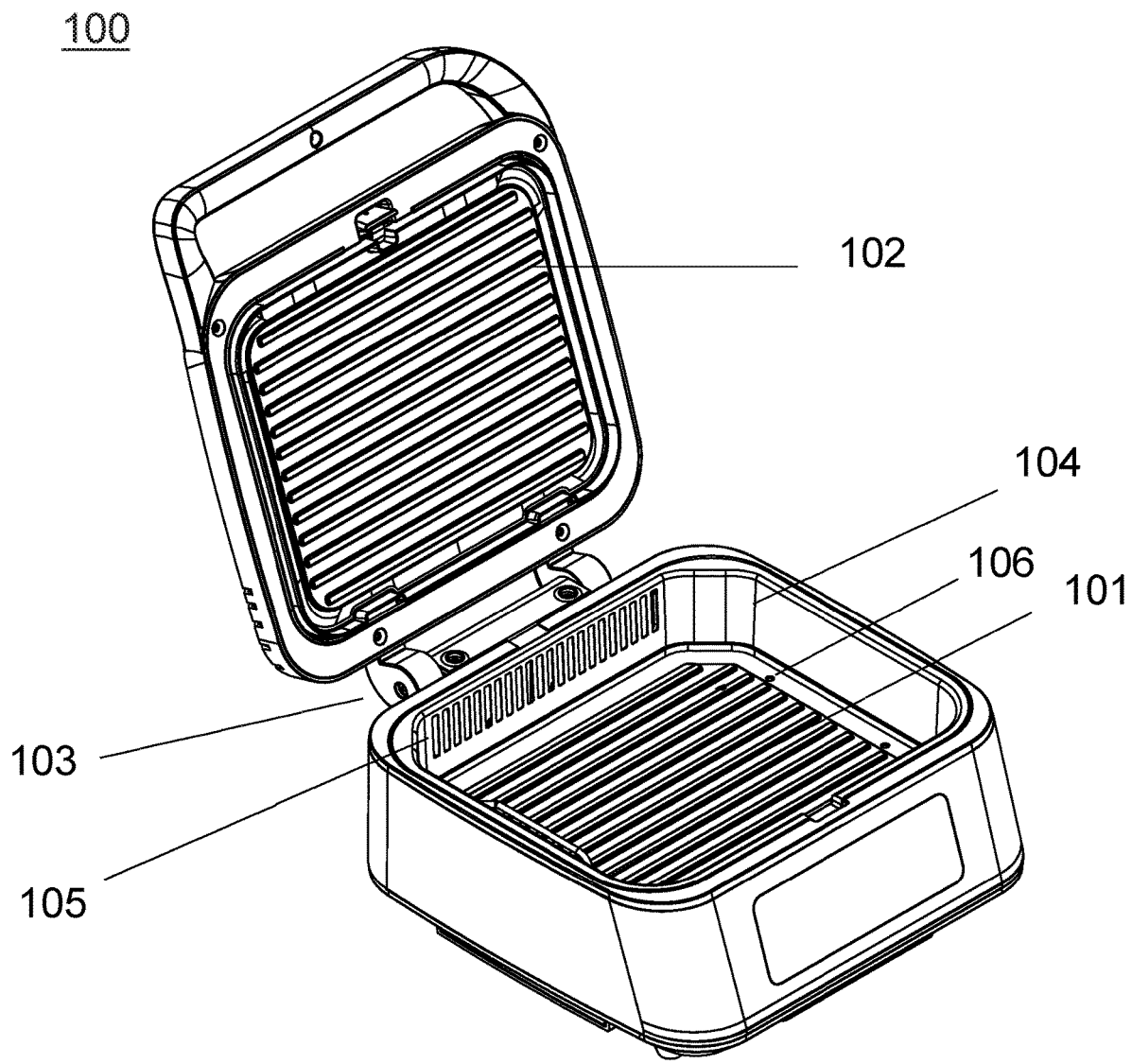
FIG. 1 is a perspective view of one embodiment of an open indoor grill with a lowered lower element, in accordance with certain examples of the technology disclosed herein.

FIG. 1 is a perspective view of one embodiment of an open indoor grill 100 with a lowered lower element 101, in accordance with certain examples of the technology disclosed herein. The indoor grill 100 is configurable to cook food items between two heated elements or plates 101 and 102. The indoor grill 100 is depicted with a lid and a handle that raises the upper element 102. The lid may be raised to place food and cooking components inside a cooking chamber of the indoor grill 100 and/or to remove the food and components. The lid raises and lowers in the example with a hinge 103 connecting the lid and the body of the indoor grill 100.

The upper element 102 and the lower element 101 are illustrated with ridges to create sear marks on the food items. The upper element 102 and the lower element 101 may have any other type of structure to create sear marks, such as crosshatches, waffle patterns, or designs. The upper element 102 in the example is affixed to the lid of the indoor grill 100 and raises and lowers with the lid. In certain examples, the elements 101, 102 are removable or replaceable. For example, the elements 101, 102 may be removed for cleaning.

The lower element 101 is illustrated in a lower position. The lower element 101 has a spring-actuated mechanism that raises and lowers the lower element 101 to allow the cooking environment to be enclosed and compress the food item between the lower element 101 and the upper element 102. In alternate examples, the upper element 102 raises and lowers. In alternate examples, both the upper element 102 and the lower element 101 raise and lower. In alternate examples, the upper element 102 or the lower element 101 raise and lower via alternate mechanisms. For example, the mechanism may be electrically powered, hydraulically powered, or powered in any other suitable manner. In FIG. 1, the lower element 101 is depicted in the lower position revealing more of the sidewall 104 to the cooking environment. The spring or other mechanism that raises and lowers the lower element 101 is in the fully compressed position.

The lower element 101 is illustrated with one or more grease drain holes 106. The lower element 101 includes a channel, holes, or other feature to drain the grease or other liquids from the food to a holding reservoir. In addition to reducing the fat and calories in the food items, removing the grease from the cooking surface of the indoor grill 100 reduces the smoke created by the upper element 102 and the lower element 101 when compressed against a food item. Heated grease creates more smoke, and removing a portion of the grease reduces the smoke created.

The sidewall 104 of the indoor grill 100 create a perimeter wall around the food items. The sidewall 104 may be a solid wall along which the movable lower element 101 moves up and down. The sidewall 104 may encircle the entire perimeter of the indoor grill 100 or may only encircle a portion of the indoor grill 100. The sidewall includes outlet vent holes 105. The outlet vent holes 105 are positioned in the example at a portion of the sidewall 104 on the rear of the indoor grill 100. The outlet vent holes 105 are illustrated as a series of slits or vents. The outlet vent holes 105 allow smoke and air from the cooking environment to be removed from the cooking environment and directed along a channel to a mechanism for removing the smoke. Any other size and shape of outlet vent holes 105 may be used, such as a single orifice, a series of round holes, a single rectangular slit, or any other suitable opening that allows the air and smoke to be drawn from the cooking environment.

In an example, on the opposing sidewall 104 from the outlet vent holes 105, is one or more return vent holes (not pictured). The return vent holes may be of a similar size and shape as the outlet vent holes 105. The return vent holes allow the air to be returned to the cooking environment after having the smoke removed. Returning the heated air to the cooking environment allows more of the heat input into the system to be retained and reduces the smoke that is exhausted to the environment. The moving, heated air also heats the food by convection heating to further reduce cooking times.

Figure 2:
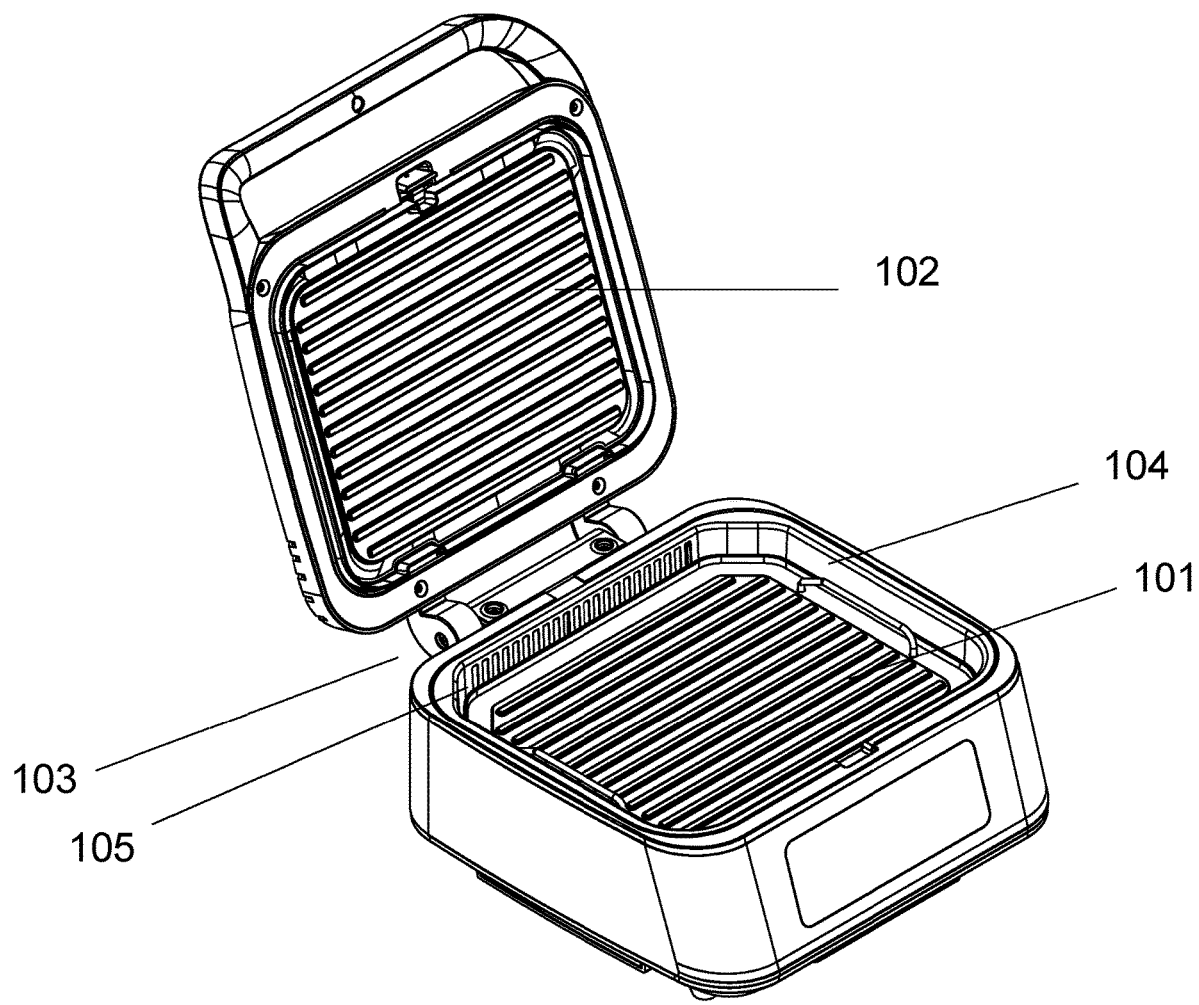
FIG. 2 is a perspective view of one embodiment of an open indoor grill with a raised lower element, in accordance with certain examples of the technology disclosed herein.

FIG. 2 is a perspective view of one embodiment of an open indoor grill 100 with a raised lower element 101, in accordance with certain examples of the technology disclosed herein. The indoor grill 100 is illustrated with the lower element 101, the upper element 102, the hinge 103, the sidewall 104, the outlet vent holes 105. The lower element 101 is illustrated in the raised position. In the raised position, the cooking environment is smaller than when the lower element 101 is in the lowered position. In the raised position, food items between the lower element 101 and the upper element 102 are in contact with both the lower element 101 and the upper element 102. The food item may receive heat from both the lower element 101 and the upper element 102. The food item may receive score or sear marks from both the lower element 101 and the upper element 102. In alternate embodiments, the lower element 101 may be retained in a lowered position. In an example with the retained lowered position, the food items do not touch the upper element 102.

Figure 3:
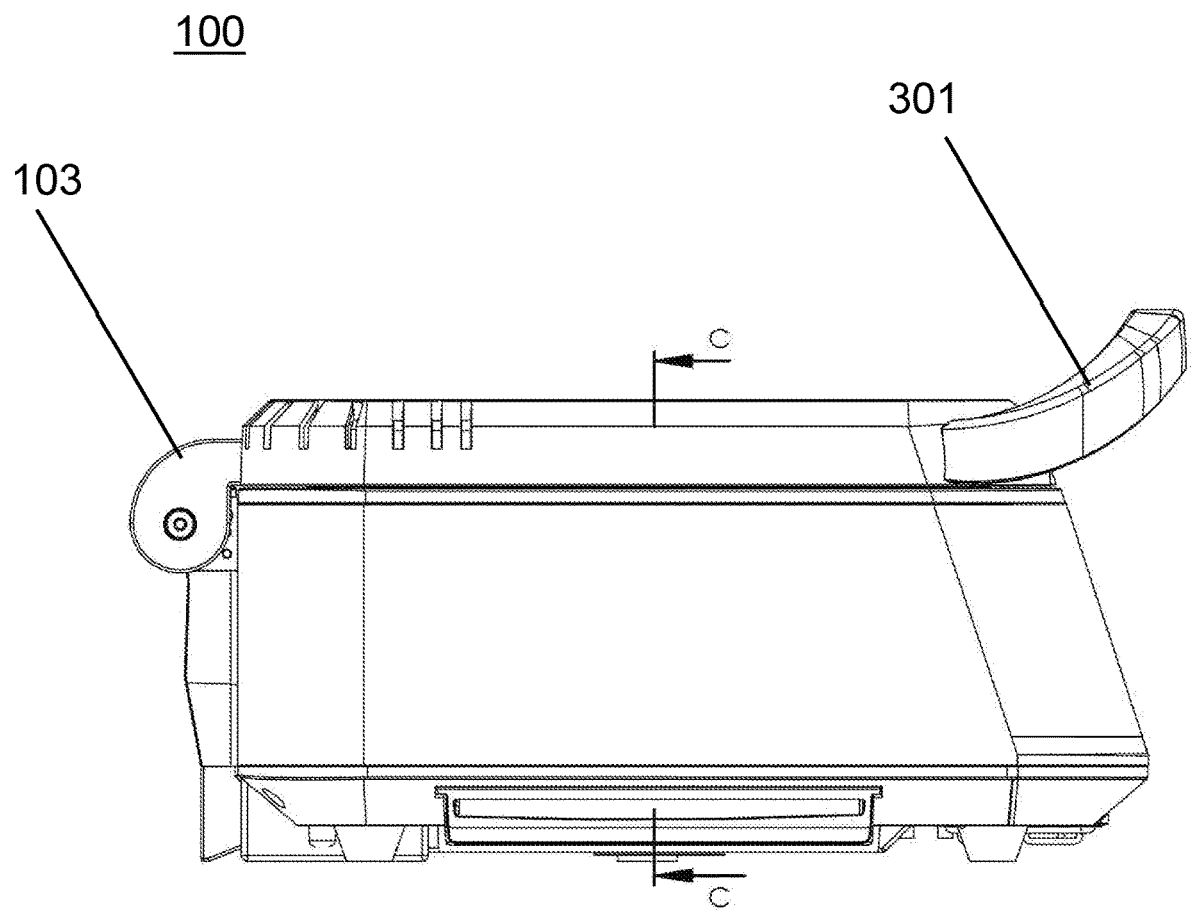
FIG. 3 is a side view of an indoor grill with a closed lid, in accordance with certain examples of the technology disclosed herein.

FIG. 3 is a side view of an indoor grill 100 with a closed lid, in accordance with certain examples of the technology disclosed herein. The indoor grill is depicted with a hinge 103 and a handle 301.

Figure 4:
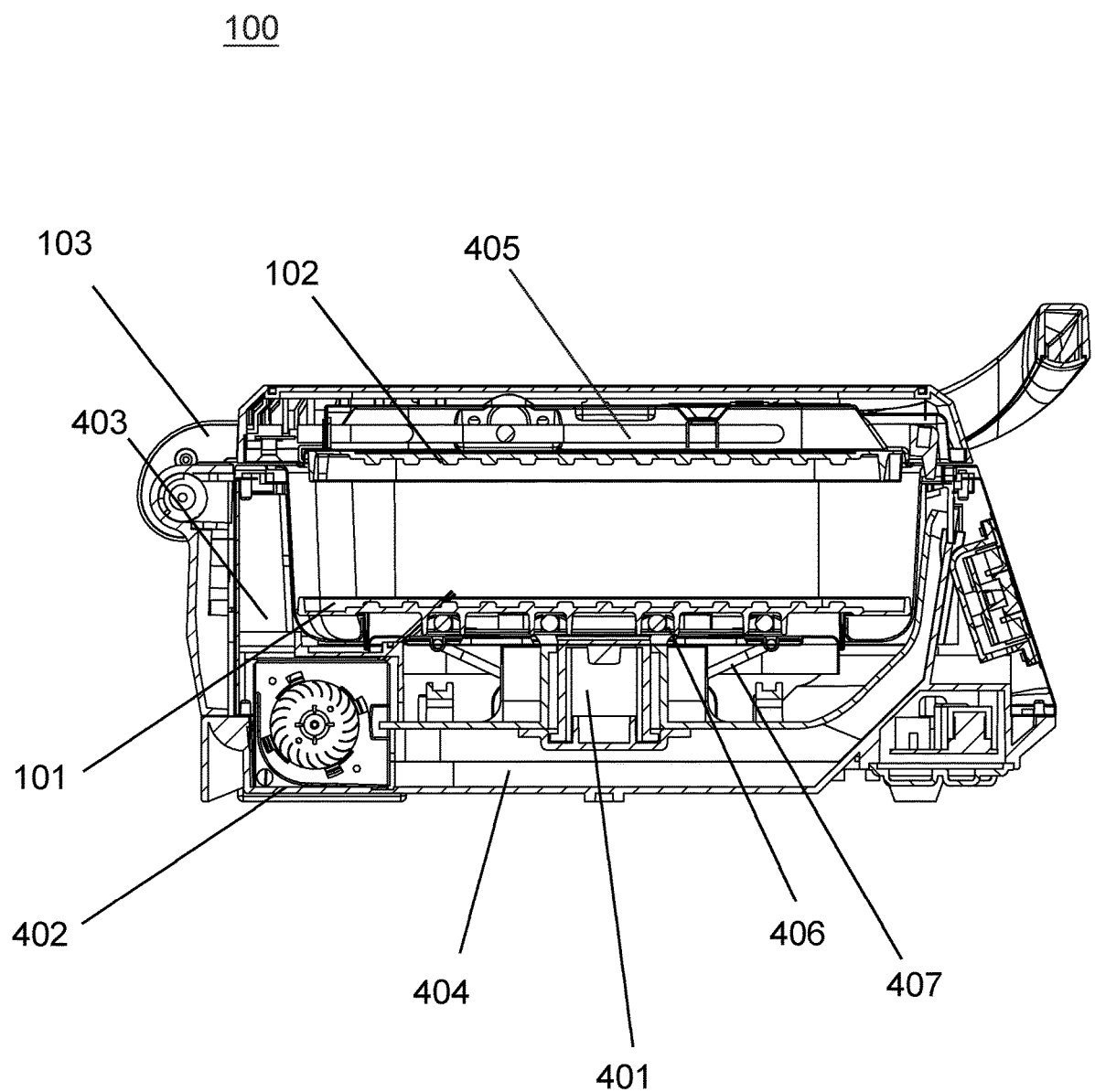
FIG. 4 is a cross-sectional side view of an indoor grill with a lowered lower element, in accordance with certain examples of the technology disclosed herein.

FIG. 4 is a cross-sectional side view of an indoor grill 100 with a lowered lower element 101, in accordance with certain examples of the technology disclosed herein. As illustrated, the cross-section view is from the side of the indoor grill 100 with the nearest half removed. The indoor grill 100 is illustrated with the lower element 101 in the lowered position. The lower element 101 is raised and lowered by the spring cylinder 401. The spring cylinder 401 has a spring-actuated mechanism that raises and lowers the lower element 101 to allow the cooking environment to be enclosed and compress the food item between the lower element 101 and the upper element 102.

In alternate examples, the upper element 102 raises and lowers with a spring cylinder 401 located on the upper portion of the indoor grill 100. In alternate examples, both the upper element 102 and the lower element 101 raise and lower. In alternate examples, the upper element 102 or the lower element 101 raise and lower via alternate mechanisms. For example, multiple springs or cylinders may be used. In other examples, the mechanism may be electrically powered, hydraulically powered, or powered in any other suitable manner. The spring or other mechanism that raises and lowers the lower element 101 is in the fully depressed position when the lower element 101 is in the lowered position.

In the example, the spring cylinder 401 is a single spring design that compresses when the lower element 101 is in the lowered position. The spring providing the upward force is housed in a cylinder or other mechanical body that is affixed to, or presses against, the lower element 101. When the spring is released, the upward force raises the lower element 101 toward the upper element 102.

The spring cylinder 401 forces the lower element 101 into the raised position when food items are not on the lower element 101 and the indoor grill 100 is not in use. When food items are placed on the lower element 101, the spring cylinder 401 is compressed by the weight of the food items and may lower the lower element 101. When the lid of the indoor grill 100 is closed, the upper element 102 provides additional downward force to the food items, which in turn provide downward force to the lower element 101. In an example, the spring force is configured to force the lower element 101 upward until the food items in the cooking environment are pressed against the upper element 102, but not forced to an extent that the food items are deformed or crushed. This equilibrium in forces allows the food item to be heated evenly by the lower element 101 and the upper element 102 at the same time. Thus, in the example, the weight of the lid and the food forces the lower element 102 downward and a manual or automatic action from the user or the indoor grill 100 is not required.

The lower element 101, in the example, is supported by linkage arms 407. Any suitable configuration or number of linkage arms 407 may be used to keep the lower element 101 stable. In an example, the linkage arms provide support for the lower element 101 and allow the lower element 101 to be stable when forced into an unlevel position. That is, if a food item on one side of the lower element 101 is taller than a food item on the other side of the lower element 101, then the spring cylinder 401 and the linkage arms 407 allow the lower element 101 to be forced lower on the side with the taller food item. That is, the upper element 102 will contact the taller food item first when the lid is closing. The side of the lower element 101 with the taller food will be forced downward before the side with the shorter food item. The lower element 101 will be slanted a certain angle off of horizontal because one side is forced lower than the other.

However, the spring cylinder 401 and the linkage arms 407 keep the lower element 101 stable and supported even when slanted. The slanting of the lower element 101 allows the food items of different heights to both be in contact with the upper element 102.

In another example, if the lower element 101 is configured to operate in a flat configuration, then the linkage arms 407 maintain the flat configuration throughout the raising and lowering of the lower element 101. If the lower element 101 is configured to be slanted away from horizontal, then the linkage arms 407 will maintain the configured angle throughout the raising and lowering of the lower element 101.

In the example, two or more linkage arms 407 are affixed to the bottom of the lower element 101 and to the sides of the spring cylinder 401 to maintain a rigid connection between the lower element 101 and the spring cylinder 401.

A cross-flow fan 402, also referred to as a tangential fan, is illustrated mounted in a space under the lower element 101. The cross-flow fan 402 is typically an electrically powered fan that pulls air and smoke from the cooking environment through the outlet vent holes 105 and forces the air back into the cooking environment through the inlet vent holes (not shown). The cross-flow fan 402 may draw the air from the cooking environment through the outlet vent holes 105 via the channel 403. The channel 403 is a sealed channel that allows the air to be drawn through the outlet vent holes 105 and supplied to the cross-flow fan 402. A second channel 404 is located on the outlet side of the cross-flow fan 402 and provides a channel to deliver the air back to the cooking environment through the inlet vent holes. The system thus forms a recirculation system from the cooking environment through the cross-flow fan 402 and back to the cooking environment. The cross-flow fan 402 may be any suitable type of fan. For example, the fan may be a centrifugal fan or an axial fan. The type of fan may be selected to increase turbulence in the drawn air to cause the smoke to be more easily removed. Typically, a cross-flow fan will create more turbulence in the environment described herein.

The indoor grill 100 may use one or more methods of removing smoke from the air. In one example, the turbulence created by the cross-flow fan 402 causes the smoke particles to precipitate from the air. The cross-flow fan 402 may be a type of fan that creates greater turbulence to remove a greater amount of smoke, such as an axial fan with a greater number of blades and/or with blades that are longer. In another example, a filter may be placed before or after the cross-flow fan 402. In another example, a pan of water or other liquid may be placed in the channel 403 or channel 404. When the smoke-filled air passes over the water, the smoke precipitates out of the passing air. Any other suitable mechanism or process may be used to remove the smoke from the air.

Electric heater coils 405 are illustrated as part of the upper element 102, and electric coils 406 are illustrated as part of lower element 101. The coils 405, 406 may be any type of resistive heater or other type of heater that heats the elements 101, 102 to cook the food items. The coils may be affixed to the body of the elements 101, 102, cast inside the body of the elements 101, 102, or in any other way configured to transmit heat to the elements 101, 102. In the examples, the coils 405, 406 are each a single resistive heater that is placed in a serpentine pattern across the surfaces of the lower element 101 and the upper element 102.

Figure 5:
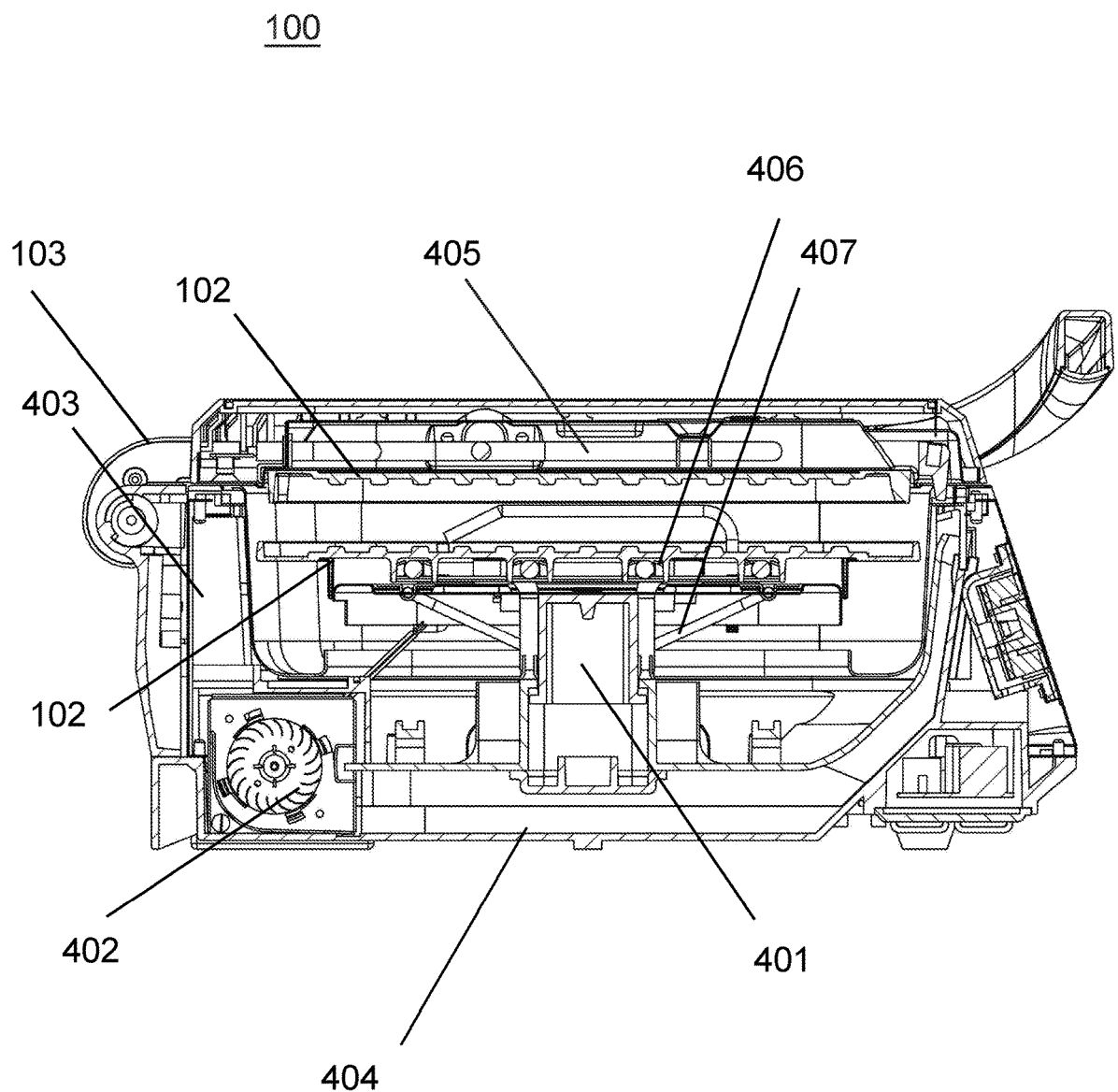
FIG. 5 is a cross-sectional side view of an indoor grill with a raised lower element, in accordance with certain examples of the technology disclosed herein.

FIG. 5 is a cross-sectional side view of an indoor grill 100 with a raised lower element 101, in accordance with certain examples of the technology disclosed herein. FIG. 5 illustrates the components such as the cross-flow fan 402, the channels 403, 404, and the coils 405, 406 as described in FIG. 4.

In the example, the spring cylinder 401 is shown as being raised to force the lower element 101 upwards towards the upper element 102. In an example, the resting state of the spring cylinder 401 is in the raised position unless weight or some other force is applied to the lower element 101 to force the spring cylinder 401 to compress. As illustrated the linkage arms 407 are raised with the lower element 101 and serve to keep the lower element 101 level and stable, as described herein.

Figure 6:
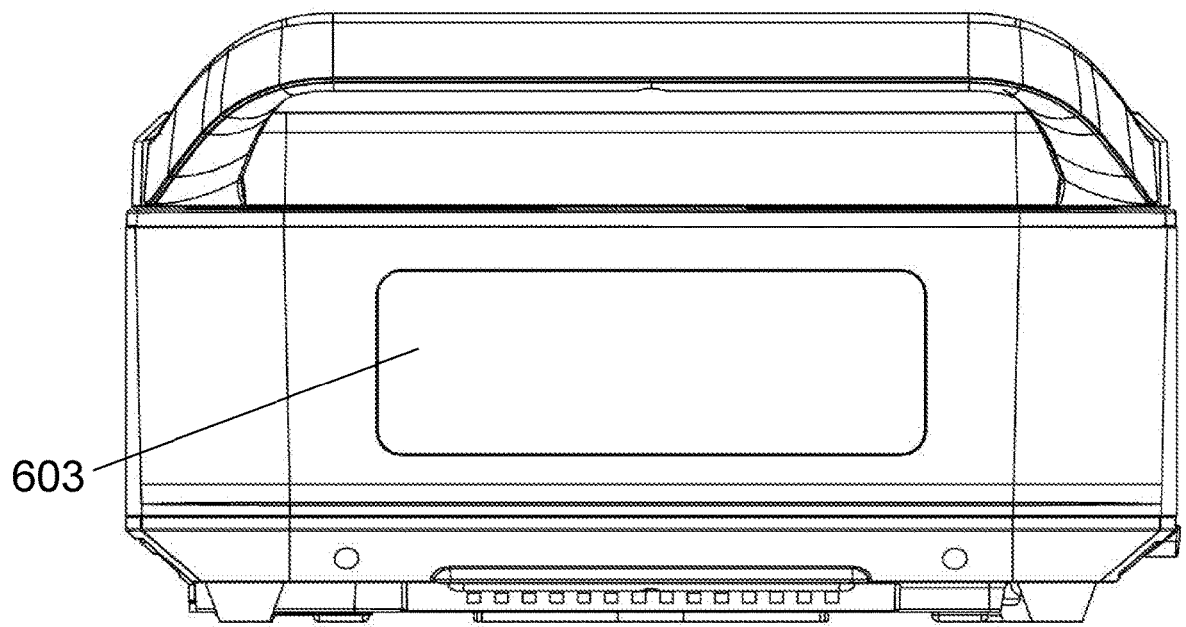
FIG. 6 is a front view of an indoor grill, in accordance with certain examples of the technology disclosed herein.

FIG. 6 is a front view of an indoor grill 100, in accordance with certain examples of the technology disclosed herein. A display 603 is illustrated. The display 603 may include features and controls such as temperature display, timer settings, temperature settings, quick start functions, preset cooking processes, or any other suitable controls. The controls may be buttons, toggles, switches, or other physical interface objects. The controls may be digital representations of interface objects. For example, the display 603 may be a touchscreen.

Figure 7:
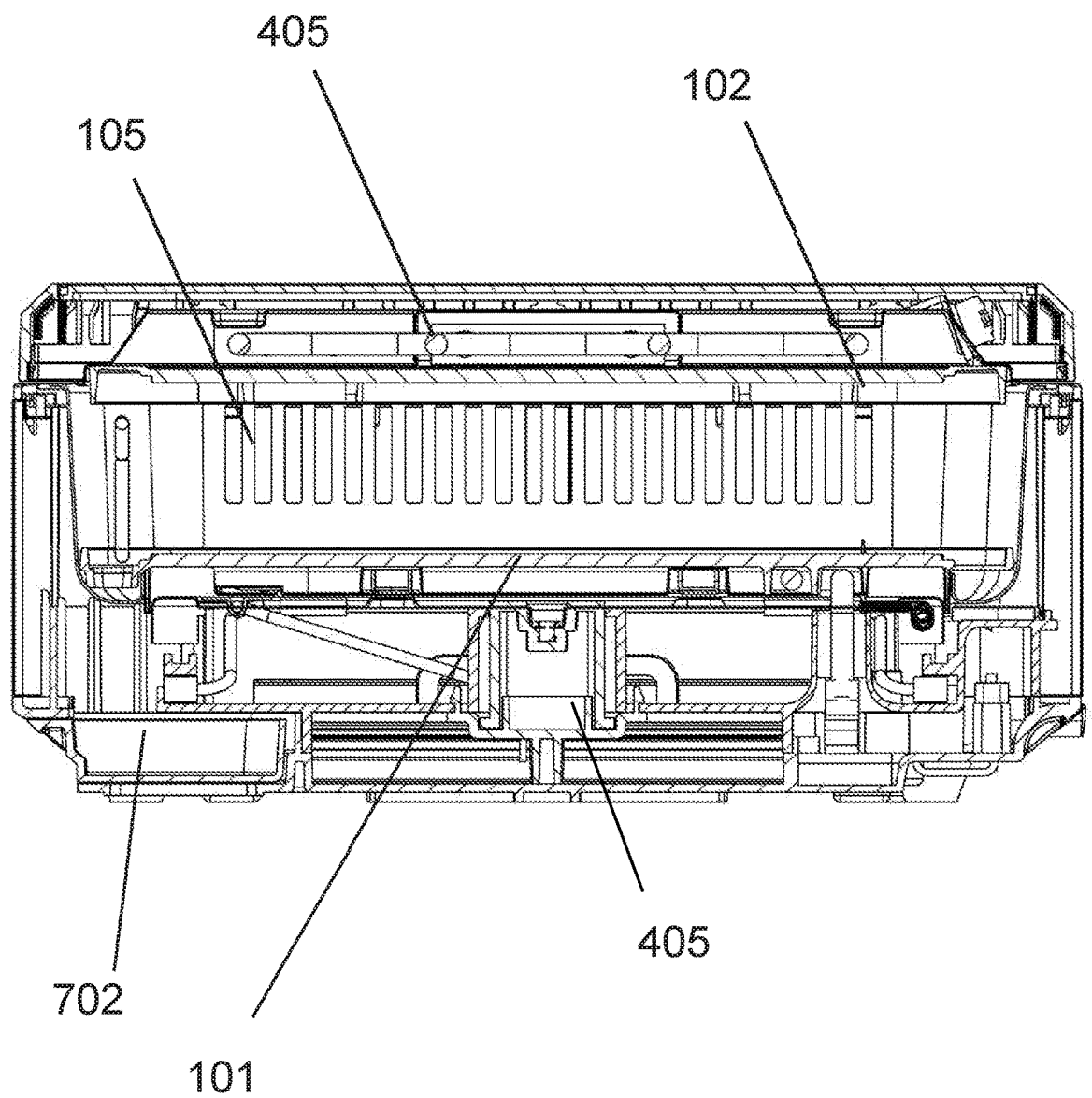
FIG. 7 is a cross-sectional front view of an indoor grill with a lowered lower element, in accordance with certain examples of the technology disclosed herein.

FIG. 7 is a cross-sectional front view of an indoor grill 100 with a lowered lower element 101, in accordance with certain examples of the technology disclosed herein. As illustrated, the cross-section view is from the side of the indoor grill 100 with the nearest half removed. The indoor grill 100 is illustrated with the lower element 101 in the lowered position. The indoor grill 100 as illustrated includes the electric coil 405, the upper element 102, the lower element 101, the spring cylinder 405 and other features as described herein in FIG. 4 and FIG. 5.

The outlet vent holes 105 are illustrated on the back sidewall. The outlet vent holes 105 are illustrated as a series of slits or vents. The outlet vent holes 105 allow smoke and air from the cooking environment to be removed from the cooking environment and directed along a channel to a mechanism for removing the smoke. Any other size and shape of outlet vent holes 105 may be used, such as a single orifice, a series of round holes, a single rectangular slit, or any other suitable opening that allows the air and smoke to be drawn from the cooking environment.

In an example, on an opposing sidewall from the outlet vent holes 105, is one or more return vent holes (not pictured). The return vent holes may be of a similar size and shape as the outlet vent holes 105. The return vent holes allow the air to be returned to the cooking environment after having the smoke removed. Returning the heated air to the cooking environment allows more of the heat input into the system to be retained.

The indoor grill 100 includes a grease holding reservoir 702. In examples, the lower element 101 includes a channel, holes, or other feature to drain the grease or other liquids from the food and to a holding reservoir 702. The holding reservoir 702 may collect and store the grease or other liquids until a user empties the holding reservoir 702. In an example, the holding reservoir 702 may be removed from the indoor grill so that the grease may be discarded. In addition to reducing the fat and calories in the food items, removing the grease from the cooking surface of the indoor grill 100 reduces the smoke created by the upper element 102 and the lower element 101. Heated grease creates more smoke and removing a portion of the grease reduces the smoke created.

Figure 8:
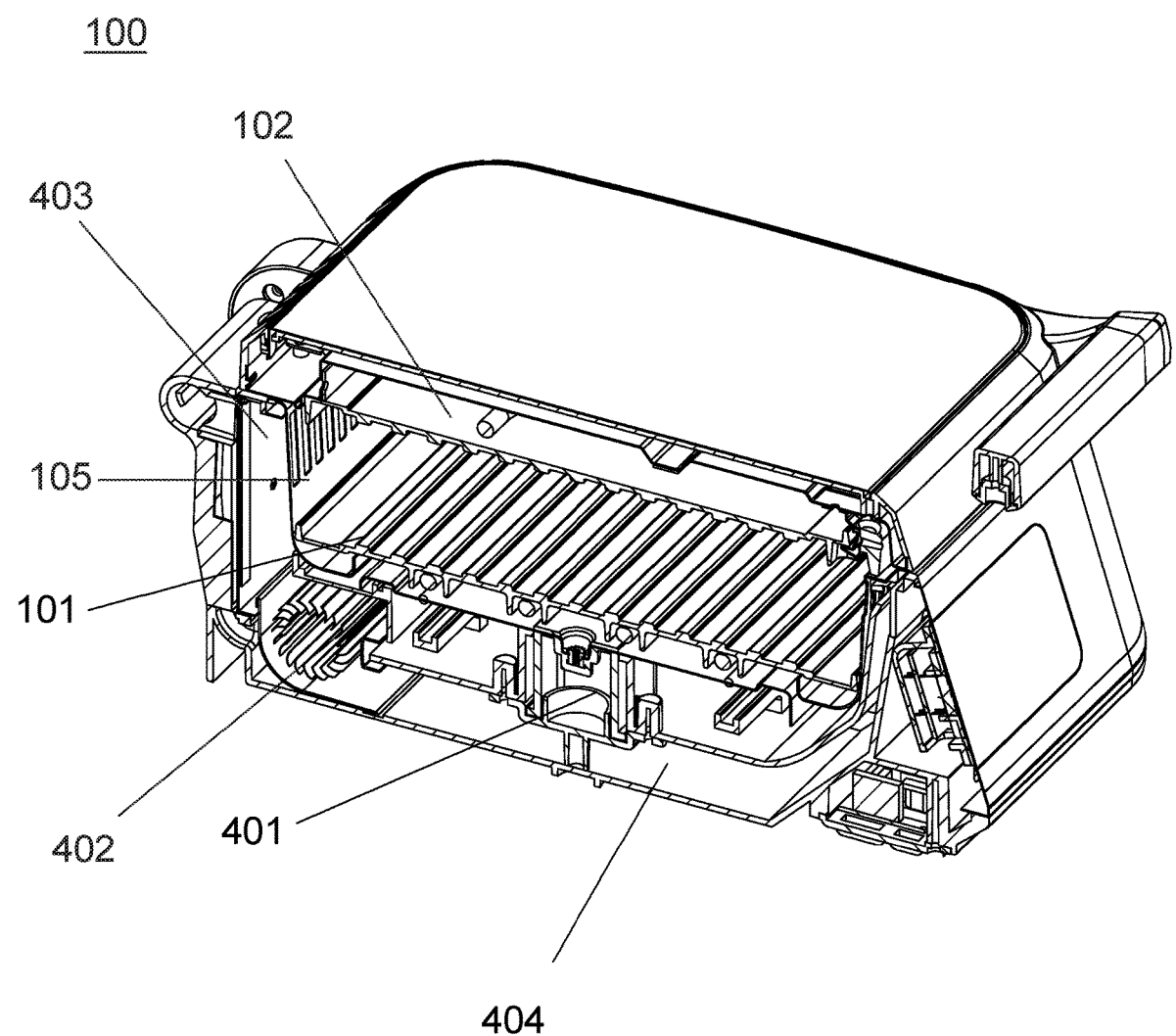
FIG. 8 is a cross-sectional perspective view of an indoor grill with a lowered lower element, in accordance with certain examples of the technology disclosed herein.

FIG. 8 is a cross-sectional perspective view of an indoor grill 100 with a lowered lower element 101, in accordance with certain examples of the technology disclosed herein.

The indoor grill 100 is illustrated with the spring cylinder 401, the cross-flow fan 402, channels 403, 404, the lower element 101, the upper element 102, the outlet vent holes 105, and other features, as described herein. The spring cylinder 401 is illustrated as compressed and the lower element 101 is lowered.

Figure 9:
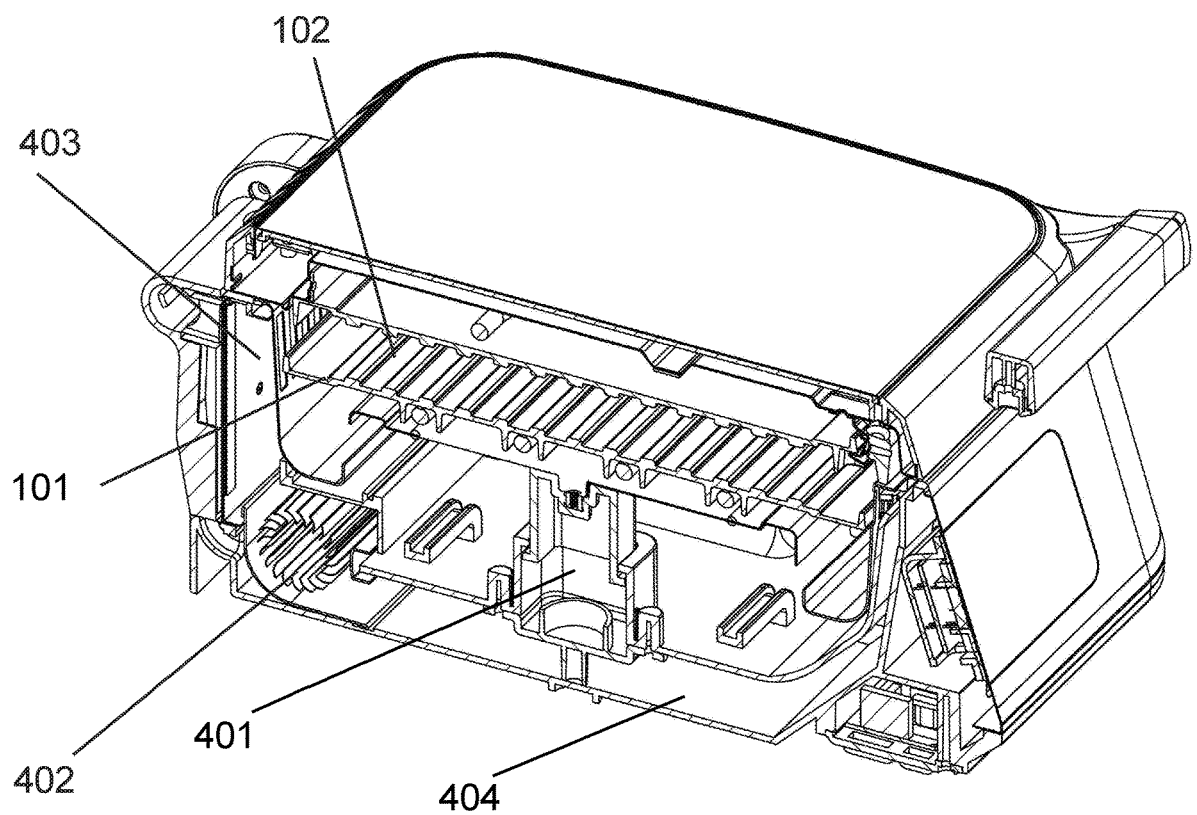
FIG. 9 is a cross-sectional perspective view of an indoor grill with a raised lower element, in accordance with certain examples of the technology disclosed herein.

FIG. 9 is a cross-sectional perspective view of an indoor grill 100 with a raised lower element 101, in accordance with certain examples of the technology disclosed herein. The indoor grill 100 is illustrated with the spring cylinder 401, the cross-flow fan 402, channels 403, 404, the lower element 101, the upper element 102, the outlet vent holes 105, and other features, as described herein. The spring cylinder 401 is illustrated as being extended and the lower element 101 is raised.

What is claimed is:

1. An indoor grill apparatus, comprising:
   an upper element and a lower element for cooking food items in a cooking environment; and
   a fan to draw air from the cooking environment and remove smoke from the air and return the air to the cooking environment after the smoke is removed,
   wherein the lower element is automatically movable from a raised position to a lowered position or from a lowered position to a raised position based on a compression of a spring actuated mechanism and is supported by linkage arms affixed to the lower element and the spring actuated mechanism that raises and lowers the lower element.

2. The apparatus of claim 1, wherein the upper element and the lower element are formed of a heat conductive metal and heated by a resistive heating coil.

3. The apparatus of claim 2, wherein when the upper element is in the lowered position, the cooking environment is substantially sealed such that the air leaves the cooking environment primarily via vent outlet holes when drawn by the fan.

4. The apparatus of claim 1, wherein the fan is a cross-flow fan to remove smoke from the air.

5. The apparatus of claim 1, further comprising a filter to remove smoke from the air.

6. The apparatus of claim 1, wherein the lower element comprises holes to allow liquids to flow off of the lower element.

7. The apparatus of claim 6, further comprising a liquid reservoir to collect the liquids that flow off of the lower element.

8. The apparatus of claim 1, wherein the upper element and the lower element have an uneven surface to create score marks in the food items.

9. A method to cook food items on an indoor grill, comprising:
   placing food items on a lower element of two or more heated elements inside an indoor grill, wherein the lower element is automatically movable from a raised position to a lowered position or from a lowered position to a raised position based on the compression of a spring actuated mechanism and is supported by linkage arms affixed to the lower element and the spring actuated mechanism that raises and lowers the lower element;
   engaging a fan to draw air from a cooking environment, remove smoke from the air, and return the air to the cooking environment after the smoke is removed; and
   closing a lid of the indoor grill, wherein closing the lid creates a sealed cooking environment.

10. The method of claim 9, wherein when a upper element is in the lowered position, the cooking environment is substantially sealed such that the air leaves the cooking environment primarily via vent outlet holes when drawn by the fan.

11. The method of claim 9, wherein the fan is a cross-flow fan to remove smoke from the air.

12. The method of claim 9, wherein the indoor grill comprises a filter to remove smoke from the air.

13. The method of claim 9, wherein the two or more heated elements have an uneven surface to create score marks in the food items.

14. The method of claim 9, wherein a lower element comprises holes to allow liquids to flow off of the lower element.

15. The method of claim 14, wherein the indoor grill comprises a liquid reservoir to collect the liquids that flow off of the lower element.

* * * * *